US009882753B2

(12) United States Patent
Kenney et al.

(10) Patent No.: US 9,882,753 B2
(45) Date of Patent: Jan. 30, 2018

(54) TONE COUNT SELECTION

(71) Applicant: Intel Corporation, Santa Clara, CA (US)

(72) Inventors: Thomas J. Kenney, Portland, OR (US); Eldad Perahia, Portland, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 15/154,340

(22) Filed: May 13, 2016

(65) Prior Publication Data
US 2016/0330057 A1  Nov. 10, 2016

Related U.S. Application Data

(60) Continuation of application No. 14/630,924, filed on Feb. 25, 2015, now Pat. No. 9,344,232, which is a continuation of application No. 13/136,523, filed on Aug. 3, 2011, now Pat. No. 8,982,970, which is a division of application No. 12/655,051, filed on Dec. 22, 2009, now Pat. No. 8,396,150.

(51) Int. Cl.
*H04L 27/28* (2006.01)
*H04L 27/26* (2006.01)
*H04L 1/00* (2006.01)
*H04L 5/00* (2006.01)

(52) U.S. Cl.
CPC ........ *H04L 27/2602* (2013.01); *H04L 1/0003* (2013.01); *H04L 1/0009* (2013.01); *H04L 1/0071* (2013.01); *H04L 5/0007* (2013.01); *H04L 5/0048* (2013.01); *H04L 27/2601* (2013.01); *H04L 27/2626* (2013.01); *H04L 27/2698* (2013.01); *H04L 1/0041* (2013.01); *H04L 1/0075* (2013.01); *Y02B 60/31* (2013.01)

(58) Field of Classification Search
CPC ............ H04L 27/2602; H04L 27/2608; H04L 5/0044; H04L 1/0071; H04L 5/0023; H04L 27/2613; H04L 7/0452; H04W 84/12

See application file for complete search history.

(56) References Cited

U.S. PATENT DOCUMENTS

| | | |
|---|---|---|
| 7,170,849 B1 | 1/2007 | Arivoli et al. |
| 8,396,150 B2 | 3/2013 | Kenney et al. |
| 8,619,814 B2 | 12/2013 | Seok |
| 8,982,970 B2 | 3/2015 | Kenney et al. |
| 9,344,232 B2 | 5/2016 | Kenney et al. |

(Continued)

FOREIGN PATENT DOCUMENTS

| | | |
|---|---|---|
| CN | 1839574 A | 9/2006 |
| CN | 101263667 A | 9/2008 |

(Continued)

OTHER PUBLICATIONS

"European Application Serial No. 10843404.4, Extended European Search Report dated May 18, 2017", 6 pgs.

(Continued)

*Primary Examiner* — David S Huang
(74) *Attorney, Agent, or Firm* — Schwegman Lundberg & Woessner, P.A.

(57) ABSTRACT

In a device or system, a total tone count is determined or selected for modulating a data payload. Two or more code words are interleaved into the data payload, and the data payload is transmitted on a channel of the device or system.

20 Claims, 5 Drawing Sheets

(56) References Cited

U.S. PATENT DOCUMENTS

| | | | |
|---|---|---|---|
| 2005/0152473 | A1 | 7/2005 | Maltsev et al. |
| 2007/0143655 | A1 | 6/2007 | Niu et al. |
| 2007/0153833 | A1 | 7/2007 | Chang et al. |
| 2007/0230594 | A1 | 10/2007 | Mo et al. |
| 2008/0175189 | A1 | 7/2008 | Furrer et al. |
| 2008/0298510 | A1 | 12/2008 | Jonsson et al. |
| 2009/0304097 | A1 | 12/2009 | Han et al. |
| 2009/0322621 | A1 | 12/2009 | Inanoglu et al. |
| 2011/0026623 | A1 | 2/2011 | Srinivasa et al. |
| 2011/0131464 | A1 | 6/2011 | Ko et al. |
| 2011/0293029 | A1 | 12/2011 | Kuwamoto et al. |
| 2012/0099667 | A1 | 4/2012 | Hansen |
| 2015/0172013 | A1 | 6/2015 | Kenney et al. |

FOREIGN PATENT DOCUMENTS

| | | | |
|---|---|---|---|
| CN | 101263668 | A | 8/2010 |
| CN | 102227112 | A | 10/2011 |
| CN | 102227112 | B | 8/2016 |
| CN | 105933093 | A | 9/2016 |
| EP | 2517428 | A2 | 10/2012 |
| JP | 2003101499 | A | 4/2003 |
| JP | 2008508816 | A | 3/2008 |
| JP | 2008245331 | A | 10/2008 |
| JP | 2009505511 | A | 2/2009 |
| JP | 2009520436 | A | 5/2009 |
| JP | 2009246501 | A | 10/2009 |
| JP | 2013513297 | A | 4/2013 |
| WO | WO-2014015948 | A1 | 2/2004 |
| WO | WO-20050064876 | A1 | 7/2005 |
| WO | WO-2006015270 | A1 | 2/2006 |
| WO | WO-2008093945 | A2 | 8/2008 |
| WO | WO-2011087559 | A2 | 7/2011 |
| WO | WO-2011087559 | A3 | 7/2011 |

OTHER PUBLICATIONS

"Japanese Application Serial No. 2015-037546, Office Action dated Aug. 30, 2016", (With English Translation), 7 pgs.
"Japanese Application Serial No. 2015-037546, Response filed Mar. 30, 2016 to Office Action dated Jan. 5, 2016", W/ English Translation, 10 pgs.
"Japanese Application Serial No. 2015-037546, Response filed Nov. 21, 2016 to Office Action dated Aug. 30, 2016", w/English Claims, 11 pgs.
"U.S. Appl. No. 12/655,051, Non Final Office Action dated May 23, 2012", 12 pgs.
"U.S. Appl. No. 12/655,051, Notice of Allowance dated Sep. 19, 2012", 9 pgs.
"U.S. Appl. No. 12/655,051, Notice of Allowance dated Oct. 25, 2012", 10 pgs.
"U.S. Appl. No. 12/655,051, Response filed Aug. 23, 2012 to Non Final Office Action dated May 23, 2012", 12 pgs.
"U.S. Appl. No. 13/136,523, Advisory Action dated Apr. 18, 2013", 3 pgs.
"U.S. Appl. No. 13/136,523, Final Office Action dated Feb. 15, 2013", 10 pgs.
"U.S. Appl. No. 13/136,523, Final Office Action dated Sep. 23, 2014", 11 pgs.
"U.S. Appl. No. 13/136,523, Non Final Office Action dated Feb. 27, 2014", 11 pgs.
"U.S. Appl. No. 13/136,523, Non Final Office Action dated May 22, 2012", 15 pgs.
"U.S. Appl. No. 13/136,523, Notice of Allowance dated Nov. 6, 2014", 8 pgs.
"U.S. Appl. No. 13/136,523, Preliminary Amendment filed Dec. 27, 2011", 6 pgs.
"U.S. Appl. No. 13/136,523, Response filed Apr. 15, 2013 to Final Office Action dated Feb. 15, 2013", 8 pgs.
"U.S. Appl. No. 13/136,523, Response filed May 27, 2014 to Non Final Office Action dated Feb. 27, 2014", 10 pgs.
"U.S. Appl. No. 13/136,523, Response filed Oct. 9, 2014 to Final Office Action dated Sep. 23, 2014", 9 pgs.
"U.S. Appl. No. 13/136,523, Response filed Oct. 22, 2012 to Non Final Office Action dated May 22, 2012", 17 pgs.
"U.S. Appl. No. 14/630,924, Examiner Interview Summary dated Nov. 18, 2015", 1 pg.
"U.S. Appl. No. 14/630,924, Non Final Office Action dated Apr. 24, 2015", 12 pgs.
"U.S. Appl. No. 14/630,924, Notice of Allowance dated Nov. 18, 2015", 10 pgs.
"U.S. Appl. No. 14/630,924, Preliminary Amendment filed Feb. 26, 2015", 9 pgs.
"U.S. Appl. No. 14/630,924, Response filed Jul. 17, 2015 to Non Final Office Action dated Apr. 24, 2015", 14 pgs.
"U.S. Appl. No. 14/630,924, Supplemental Notice of Allowability dated Mar. 14, 2016", 4 pgs.
"Chinese Application Serial No. 201010619570.0, Office Action dated Mar. 27, 2014", w/English translation, 12 pgs.
"Chinese Application Serial No. 201010619570.0, Office Action dated May 11, 2015", W/ English Translation, 8 pgs.
"Chinese Application Serial No. 201010619570.0, Office Action dated Jul. 2, 2013", w/English translation, 11 pgs.
"Chinese Application Serial No. 201010619570.0, Office Action dated Oct. 15, 2014", W/ English Translation, 7 pgs.
"Chinese Application Serial No. 201010619570.0, Office Action dated Dec. 10, 2015", W/ English Translation, 17 pgs.
"Chinese Application Serial No. 201010619570.0, Response filed Feb. 24, 2016 to Office Action dated Dec. 10, 2015", with English translation of claims, 31 pgs.
"Chinese Application Serial No. 201010619570.0, Response filed Jul. 24, 2015 to Office Action dated May 11, 2015", W/ English Claims, 22 pgs.
"Chinese Application Serial No. 201010619570.0, Response filed Nov. 14, 2013 to Office Action dated Jul. 2, 2013", w/English claims, 22 pgs.
"Chinese Application Serial No. 201010619570.0, Response filed Dec. 30, 2014 to Office Action dated Oct. 15, 2014" W/ English Claims, 22 pgs.
"European Application Serial No. 10843404.4, Office Action dated Aug. 22, 2012", 2 pgs.
"European Application Serial No. 10843404.4, Amendment filed Feb. 22, 2013", 5 pgs.
"HT PHY Specification", Enhanced Wireless Consortium, V1.27, (Dec. 23, 2005).
"IEEE Std", IEEE Std 802.11n-2009, (Oct. 29, 2009), 261-267, 293-296, 301-302.
"International Application Serial No. PCT/US2010/056202, International Preliminary Report on Patentability dated Jul. 5, 2012", 6 pgs.
"International Application Serial No. PCT/US2010/056202, International Search Report dated Jul. 28, 2011", 3 pgs.
International Application Serial No. PCT/US2010/056202, Written Opinion dated Jul. 28, 2011, 4 pgs.
"Japanese Application Serial No. 2012-542036, Amendment filed Dec. 17, 2012", w/English claims, 21 pgs.
"Japanese Application Serial No. 2012-542036, Examiners Decision of Final Rejection dated Oct. 28, 2014", W/ English Translation, 6 pgs.
"Japanese Application Serial No. 2012-542036, Office Action dated Apr. 8, 2014", w/English translation, 4 pgs.
"Japanese Application Serial No. 2012-542036, Office Action dated Dec. 3, 2013", w/English translation, 4 pgs.
"Japanese Application Serial No. 2012-542036, Response filed Mar. 3, 2014 to Office Action dated Dec. 3, 2013", w/English claims, 11 pgs.
"Japanese Application Serial No. 2012-542036, Response file Jun. 16, 2014 to Office Action dated Apr. 8, 2014", W/ English Claims, 11 pgs.
"Japanese Application Serial No. 2015-037546, Office Action dated Jan. 5, 2016", W/ English Translation, 9 pgs.
Nee, Richard Van, "Strawmodel 802.11ac Specification Framework", doc.:IEEE 802.11-09/0633r0, [Online] retrieved from the

(56) References Cited

OTHER PUBLICATIONS internet: <https://mentor.ieee.org/802.11/dcn/09/11-09-0633-00-00ac-strawmodel-802-11ac-specification-framework.pptx)>, (May 14, 2009), 1-30.

Ramadurai, Vaidyanathan, et al., "Software Implementation of 802.11a blocks on Sandblaster DSP", Proceedings of Software Defined Radio Technical Forum (SDR Forum '06),, [Online]. Retrieved from the Internet: <http://www.glossner.org/john/>, (Nov. 2006), 5 pgs.

| $N_{SD}$ | Pilot, DC, Guard Tones (256-SD) | $y$ | $N_{COL}$ |
|---|---|---|---|
| 216 | 40 | 9 | 24 |
| 216 | 40 | 8 | 27 |
| 220 | 36 | 11 | 20 |
| 220 | 36 | 10 | 22 |
| 224 | 32 | 8 | 28 |
| 228 | 28 | 6 | 19 |
| 228 | 28 | 12 | 12 |
| 230 | 26 | 10 | 23 |
| 232 | 24 | 8 | 29 |
| 234 | 22 | 9 | 26 |
| 240 | 16 | 6 | 20 |
| 240 | 16 | 8 | 30 |
| 242 | 14 | 11 | 22 |

| Modulation | Code Rate | $N_{SD}$ | Pilot,DC, Guard (256-Nsd) | $y$ | $N_{COL}$ |
|---|---|---|---|---|---|
| 256-QAM | 3/4 | 232 | 24 | 8 | 29 |
|  |  | 234 | 22 | 9 | 26 |
| 256-QAM | 5/6 | 234 | 22 | 9 | 26 |
| 256-QAM | 7/8 | 232 | 24 | 8 | 29 |
|  |  | 234 | 22 | 9 | 26 |
| 1024-QAM | 3/4 | 232 | 24 | 8 | 29 |
|  |  | 234 | 22 | 9 | 26 |
| 1024-QAM | 5/6 | 234 | 22 | 9 | 26 |
| 1024-QAM | 7/8 | 232 | 24 | 8 | 29 |
|  |  | 234 | 22 | 9 | 26 |

TONE COUNT SELECTION

RELATED APPLICATION

This application is a continuation of and claims priority to U.S. patent application Ser. No. 14/630,924 filed on Feb. 24, 2015 and entitled "Tone Count Selection," which is a continuation of and claims priority to U.S. patent application Ser. No. 13/136,523 filed on Aug. 8, 2011 and entitled "Tone Count Selection," which is a divisional of and claims priority to U.S. patent application Ser. No. 12/655,051, filed on Dec. 22, 2009, and entitled "Tone Count Selection."

BACKGROUND

Orthogonal frequency division multiplexing (OFDM) provides a useful way to modulate data for transmission. OFDM may be considered a form of digital multi-carrier modulation. A large number of orthogonal sub-carriers are used to carry data. Data for transmission is then divided into several parallel data streams for transmission. Each of the sub-carriers may in turn be modulated using binary phase-shift keying (BPSK), quadrature phase-shift keying (QPSK), quadrature amplitude modulation (QAM), and so forth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols to during transmission to avoid inter-symbol interference (ISI), such as might result from multi-path distortion. These guard tones also help the signal conform to a spectral mask. The nulling of the direct component (DC) may be used to simplify direct conversion receiver designs.

Selecting tone for use within a given OFDM system has proven problematic, particularly when constraints such as reuse of existing OFDM components are included.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

OFDM is used for modulating communications both for wired and wireless devices. As described above, an OFDM system uses selected tones for operation. These tones may be used for data, pilot, guard, DC, and other functions.

Demands for higher capacity communications may result in modifications to OFDM systems to increase capacity. It is beneficial for these modifications to make use of existing code and hardware where possible. For example, in a wireless OFDM system a deployed interleaver/deinterleaver may be re-used in an OFDM system using larger bandwidth with minimal modification. This re-use minimizes development costs and risk associated with new technologies.

Disclosed in this application is a system and techniques suitable for selecting tones for use by an OFDM system, such that existing OFDM components may be leveraged and re-used with minimal or no changes. In one example, a wireless communication system using OFDM with a 40 MHz channel bandwidth may be extended to 80 MHz, increasing the data transmission capacity of the system.

Illustrative Architecture

Figure 1:
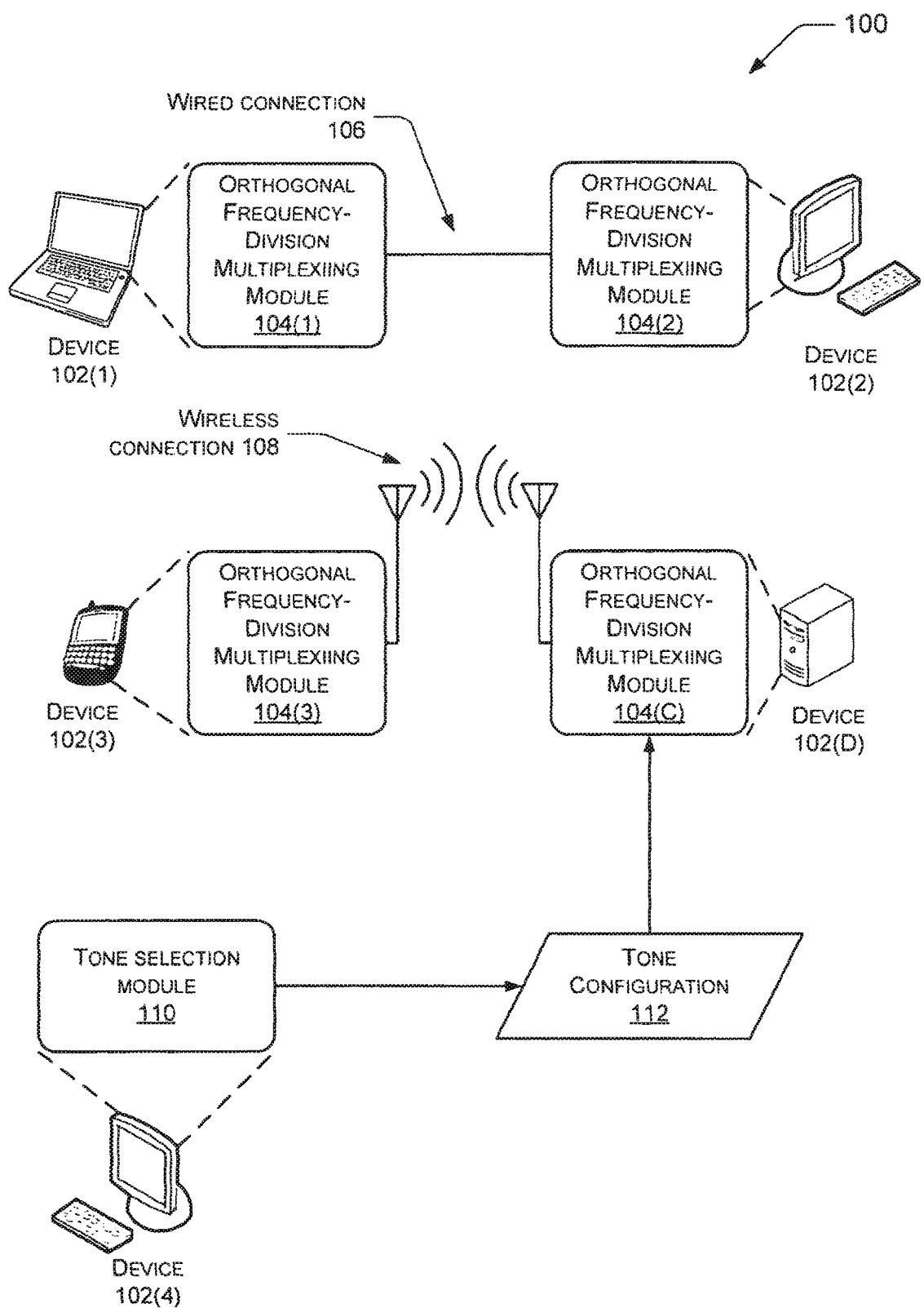
FIG. 1 is an illustrative architecture of a tone selection module and OFDM modules using selected tones.

FIG. 1 is an illustrative architecture 100 of a tone selection module and OFDM modules using the selected tones. A device 102(1) is shown with an orthogonal frequency division multiplexing (OFDM) module 104(1) which is coupled via a wired connection 106 to an OFDM module 104(2) in a device 102(2). OFDM module 104 is configured to generate an OFDM signal. Also shown is a wireless device 102(3) having an OFDM module 104(3) which is wirelessly coupled to OFDM module 104(C) in device 102(D). Each device 102(1)-(D) includes a transmitter, receiver, or transceiver to convey output from one OFDM 104 module to another OFDM module 104. These transmitters, receivers, or transceivers may be configured to convey the output via an electrical conductor, electromagnetic radiation, or both. Each device 102(1)-(D) includes one or more processors (not shown) and a memory (not shown) coupled to the processor. This processor may be configured to execute instructions stored in the memory.

Devices 102(1)-(D) may include wireless access points, radio frequency transceivers, software defined radios, modems, interface cards, cellular telephones, portable media players, desktop computers, laptops, tablet computers, netbooks, personal digital assistants, servers, standalone transceiver interfaces, and so forth.

A tone selection module 110 may be present within device 102(4). Tone selection module 110 generates and may output one or more OFDM tone configurations 112. These tone configurations 112 meet one or more pre-determined constraints. In one implementation, constraints may include ability to re-use an existing interleaver/deinterleaver, specific modulation such as 256-QAM, and so forth. The process utilized by the tone selection module 110 is discussed in more detail below with regards to FIGS. 2 and 3.

Tone configuration 112 may then be implemented within OFDM modules 104(1)-(C) for use in transferring information between two or more devices 102(1)-(D). As described above, the tones in the tone configuration 112 may be selected to facilitate re-use of existing components such as the interleaver/deinterleaver.

Figure 2:
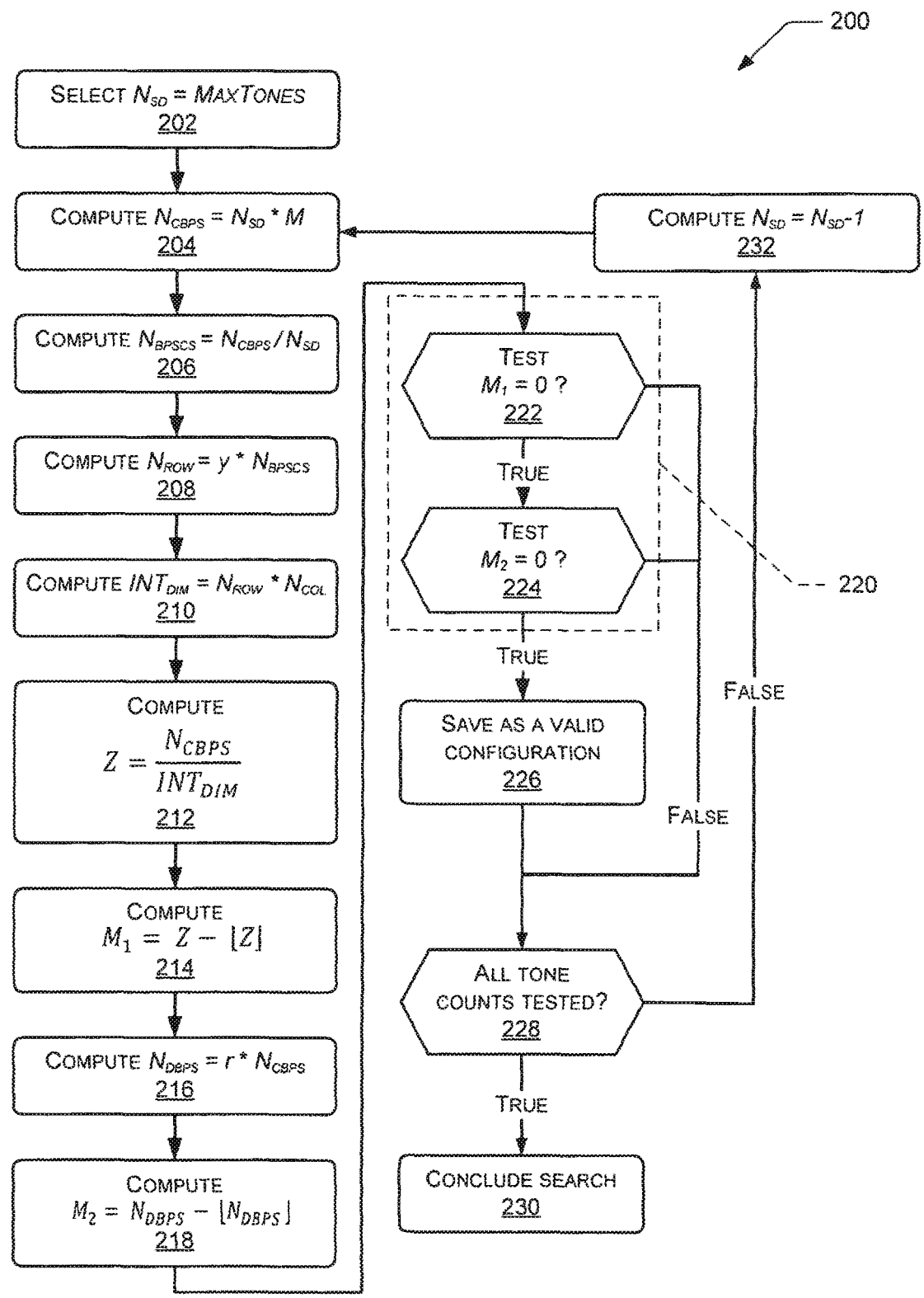
FIG. 2 is a flow chart of a process for selecting tones for use by an OFDM module.

FIG. 2 is a flow chart for an example process 200 for selecting tones with a tone selection module 110. Selected tones may be used by an OFDM module 104. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 202, the tone selection module 110 accepts a selection of a number of data subcarriers $N_{SD}$ to test. $N_{SD}$ may be selected to maintain compatibility with an existing OFDM system. For example, an OFDM system with a 40 MHz channel bandwidth may be modified to 80 MHz channel bandwidth to increase data capacity. For the following examples, assume at least 1 tone is assigned to DC, at least 7 tones will be utilized for guard, and the 40 MHz system uses 108 data tones. Doubling the channel bandwidth from 40 MHz to 80 MHz would double the number of data tones, thus $N_{SD}=2*108=216$ data tones.

At block 204, a number of coded bits per symbol $N_{CBPS}=N_{SD}*M$ is computed where M comprises a modulation order. This modulation order may be used to represent characteristics of the subcarrier modulation. In one implementation, the modulation order may comprise one of the following integer values:

1 for a binary phase-shift keying (BPSK) modulation;
2 for a quadrature phase-shift keying (QPSK) modulation;
4 for quadrature amplitude modulation (QAM) with 16 states (16-QAM);
6 for QAM with 64 states (64-QAM);
8 for QAM with 256 states (256-QAM); or
10 for QAM with 1024 states (1024-QAM).

Continuing the example above, assume BPSK will be assessed initially. Thus, $N_{CBPS}=N_{SD}*M=216*1=216$ coded bits per symbol. At block 206, a number of coded bits per single carrier $N_{BPSCS}=N_{CBPS}/N_{SD}$ is calculated. Continuing the example from above, $N_{BPSCS}=216/216=1$. At block 208, $N_{ROW}=y*N_{BPSCS}$ is computed, where y is an assigned interleaver parameter. Thus, the number of rows in an OFDM interleaver are $y*N_{BPSCS}$. As shown below with regards to table 20-16, in some OFDM systems where y=4, $N_{ROW}=4*N_{BPSCS}$, while in other systems where y=6, $N_{ROW}=6*N_{BPSCS}$, and so forth. Given a specified $N_{ROW}$ and $N_{BPSCS}$, y may be determined.

In an OFDM module 104, an interleaver intersperses constituents of two or more codewords together before transmission on a channel. A deinterleaver reverses this process. In some implementations a modified version of an interleaver used in Institute of Electrical and Electronics Engineers (IEEE) 802.1-compliant OFDM systems may be used. This channel interleaver is defined in section 20.3.11.7.3 of the IEEE P802.11n/D6.0, "Draft Standard for Information Technology-Telecommunications and information exchange between systems—Local and metropolitan area networks—Part 11: Wireless LAN Medium Access Control (MAC) and Physical Layer (PHY) specifications." From this text, interleaver parameters from Table 20-16 "Number of Rows and columns in the interleaver" are shown below.

TABLE 20-16

| Bandwidth | 20 MHz | 40 MHz |
|---|---|---|
| $N_{COL}$ | 13 | 18 |
| $N_{ROW}$ | 4* $N_{BPSCS}$ | 6* $N_{BPSCS}$ |
| $N_{ROT}$ | 11 | 29 |

These parameters define the number of coded symbols stored in the interleaver. Continuing the example above for expanding from a 40 MHz channel bandwidth to 80 MHz channel bandwidth, the existing interleaver and associated algorithms may be reused. Such reuse calls for modification of the interleaver to accommodate a matrix defined to write and read data in the OFDM system with the greater channel bandwidth. These parameters include $N_{ROW}$ and $N_{COL}$ which define the number of coded symbols stored in the interleaver. Thus, continuing the example, $N_{ROW}=9*1=9$. In accommodating the larger matrix, $N_{ROT}$ is used to define a rotation of values when more than one spatial stream exists. $N_{ROT}$ may be ignored because it does not define the interleaver size and thus does not affect tone selection.

At block 210, $INT_{DIM}=N_{ROW}*N_{COL}$ is computed. In this example, assuming $N_{COL}=24$ (as shown below with regards to FIG. 4) then $INT_{DIM}=9*24=216$. At block 212, $$Z = \frac{N_{CBPS}}{INT_{DIM}}$$

is computed. In this example, $Z=216/216=1$.

At block 214, $M_1=Z-[Z]$ is computed. Continuing the example, $Z=1-1=0$. At block 216, a number of data bits per symbol $N_{DBPS}=r*N_{CBPS}$, where r is a code rate, is computed. Code rate indicates the portion of non-redundant information present when data is encoded. For this example, assume a code rate of ½, indicating that half of the data actually transmitted is non-redundant, while the other half is redundant such as may be included due to error correction protocols. Thus, $N_{DBPS}=½*216=153$. At block 218, $M_2=N_{DBPS}-\lfloor N_{DBPS} \rfloor$. In this example, $M_2=153-\lfloor 153 \rfloor=0$.

Certain tone selections may fail to work properly with certain modulation techniques. Thus, it may be useful to test configurations to confirm a particular combination of code rate and modulation is valid. A particular combination may be considered valid when that combination will function using an existing or minimally extended OFDM component, such as an interleaver. In other words, will a particular combination of code rate and modulation work with a given tone selection? For example, in some OFDM systems, non-integer numbers of bits cannot be processed due to the mapping done in encoding, modulation. It is possible with certain selections of coding, modulation and tone selection that the test at block 214 passes, but the result is a non-integer number for $N_{DBPS}$ results. An information bit must be a full bit, as OFDM cannot encode information in a partial bit. In some implementations, bit padding may be used to take non-integer numbers of bits and add additional bits to produce an output with an integer number of bits.

When bit padding is not in use, the constraints as shown within the dotted line at 220 may be used to limit output of tone selections to those which have integer numbers of bits. This may also limit code rates which are available. For example, using 256-QAM, code rates of ⅔ and ⅚ may not be available without extensive modification to existing OFDM systems. Such modification may render the resulting OFDM system incompatible with prior OFDM systems.

At block 222, a test is performed to determine if $M_1=0$. When this test is true, block 224 tests to determine if $M_2=0$. As mentioned above, in some implementations where bit padding is available, or these constraints shown within 220 otherwise do not apply, they may be omitted. Continuing the above example, $M_1=0$ and $M_2=0$, therefore the configuration is valid. When block 222 or 224 result in a false output, the process may continue to block 228 below to determine if all tone counts have been tested.

At block 226, a resulting tone selection may be saved as a valid configuration. The previous acts may be looped until all available tone counts are tested. At block 228, when all tone counts have been tested, the process then proceeds to block 230 and the search concludes. Results from this process may then be stored to computer-readable storage media, presented to a user, and so forth.

When block 228 determines tone counts remain to be tested, at block 232 $N_{SD}=N_{SD}-1$ is computed. The results may be returned to block 204 for the process to continue until all tone counts have been tested.

Figure 3:
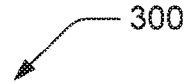
FIG. 3 is an example script for selecting tones for use by an OFDM module.

FIG. 3 is an example script for selecting tones for use by the OFDM module 104. This script is written for use with the MATLAB simulation tool for one implementation of a tone count selection module 110. MATLAB is a product of The MathWorks Inc. of Natick, Mass. This script is provided as an example, not as a limitation.

Within this script, the process iterates over a set of possible data tones in the range of 216 to 248. The 216 value was chosen as described above. Legacy OFDM systems used a total of 64 tones in conjunction with a 20 MHz channel bandwidth, and 128 tones in conjunction with a 40 MHz channel bandwidth. In order to reuse the same tone spacing of the legacy systems and thus maximize reuse of hardware and software, an 80 MHz channel bandwidth system would use 256 tones. Given this constraint of 256 tones, 248 is chosen because with 256 tones total, only 8 tones would be available for other uses including pilot, guard, and DC. Given that 8 tones may be impractically limiting for an OFDM system, 248 was selected in this example as an upper bound.

Next, an inner loop iterates over the $N_{COL}$ interleaver dimension. In this example, this loop iterates from 1 to 12, which maps a column size of 18 to 30 in an interleaver. In a wireless protocol defined by specification IEEE 802.11, the column size was 13 for 20 MHz bandwidth and 18 for 40 MHz bandwidth, thus a range of 18 to 30 is appropriate for an OFDM system having an 80 MHz bandwidth.

The next inner loop is for the $N_{ROW}$ count, which is allowed to run from 6 to 12 in this example. In the wireless protocol defined by specification IEEE 802.11, the row multiplier is 4 for 20 MHz, 6 for 40 MHz, thus a range of 6 to 12 is appropriate for 80 MHz. The next two inner loops are for the modulation and code rate. The code rate may be selected based on the modulation type.

Figure 4:
FIG. 4 is a table of illustrative possible configurations for an OFDM system having an 80 MHz bandwidth.

FIG. 4 is a table of illustrative possible configurations 400 generated using the script of FIG. 3 for an OFDM system having an 80 MHz bandwidth. In some implementations, these tone configurations 112 may be applied to a wireless networking protocol using OFDM, including but not limited to those related to the IEEE 802.11 standard. In generating this table of configurations 400 the following assumptions were made of an 80 MHz bandwidth OFDM system having tone spacing, modulation, and coding rates present in existing systems. These constraints are included to maximize reuse of software and hardware designs, and may also provide an avenue for backward compatibility.

Based on this configuration and assuming no changes in the 80 MHz system for coding or modulation, several configurations shown at 400 are possible. In one implementation, the same tone assignment for the guard tones, pilot tones, and DC as in a 40 MHz system may be used. For example, in the 40 MHz system there are 11 guard, 6 pilot, and 3 DC tones, for a total of 20 tones. Therefore, data tone assignments larger than 256−20=236 are not available.

In another implementation, a 234 data tone configuration may be suitable. This configuration allows an additional 2 tones to be allocated to pilot, guard, or other use. In another implementation, 232 tones may be allocated, which would provide 4 additional tones for pilot or guard functions.

Figure 5:
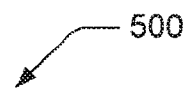
FIG. 5 is a table of possible allocations for new modulation and coding types, based on a portion of the possible configurations of FIG. 4.

FIG. 5 is a table 500 of possible tone configurations based on a portion of the possible configurations of FIG. 3. In a wireless networking system, additional code rates and modulation types may be included to increase peak data rates. In the table 500, a 256 state QAM modulation and a 1024 state QAM as well as a code rate of r=⅞ have been introduced.

Given the 256-QAM and 1024-QAM and a code rate r=⅞, the process of FIG. 2 as implemented by the script of FIG. 3 may be used to determine possible tone configurations 112. The configurations of the table 500 are focused on tone counts under the 236 tone count arrived above, and above a tone count of 230. When $N_{SD}=234$ all code rates ¾, ⅚, and ⅞ are available, providing flexibility in selection. In comparison, when $N_{SD}=232$ only the ¾ and ⅞ code rates are supported.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic disk storage or other magnetic storage devices, or any other medium which can be used to store the desired information and which can be accessed by a computing device.

What is claimed is:

1. A method performed by a communication device configured to operate over different channel bandwidths, the method comprising:
   determining whether bit padding is available;
   in response to determining that bit padding is unavailable, iterating through a plurality of total data tone counts to determine particular tone data counts that satisfy:

$$\frac{N_{CBPS}}{INT_{DIM}} - \left\lfloor \frac{N_{CBPS}}{INT_{DIM}} \right\rfloor = 0,$$

$$N_{DBPS} - \lfloor N_{DBPS} \rfloor = 0,$$

and
   where $N_{CBPS}$ is a number of coded bits per symbol, $INT_{DIM}$ is a number of coded symbols stored in an interleaver, and $N_{DBPS}$ is a number of data bits per symbol; and
   selecting a total data tone count, from among the particular tone data counts, for modulating a data payload in accordance with orthogonal frequency division multiplexing (OFDM) transmission in an OFDM system over an identified one of the channel bandwidths.

2. The method of claim 1, further comprising:
interleaving two or more codewords in the data payload before transmission on a channel of the identified channel bandwidth using the interleaver, wherein the number of coded symbols stored in the interleaver is proportional to an assigned interleaver parameter times a number of coded bits per single carrier.

3. The method of claim 1, further comprising:
determining whether iteration through the plurality of total data tone counts has been completed, and
in response to determining that iteration through the plurality of total data tone counts has been completed, presenting the particular tone data counts on a display.

4. The method of claim 1, further comprising:
after completing iteration through the plurality of total data tone counts and determining that no particular tone data counts were determined, presenting on a display the plurality of total data tone counts and an indication that no particular tone data counts were determined.

5. The method of claim 1, further comprising:
in response to determining that bit padding is available, selecting the total data tone from among the plurality of total data tone counts free from iterating through the plurality of total data tone counts to determine the particular tone data counts.

6. The method of claim 1, further comprising:
determining whether a set of the particular tone data counts result in a non-integer number of data bits per symbol;
determining that non-integer numbers of bits are unable to be processed in the OFDM system; and
limiting selection of the total data tone count to avoid selection of the set of the particular tone data counts in response to determining that non-integer numbers of bits are unable to be processed and that bit padding is unavailable.

7. The method of claim 1, wherein:
the number of coded bits per symbol is equal to a number of data subcarriers times a modulation order, and
the number of data bits per symbol is a code rate times the number of coded bits per symbol.

8. The method of claim 7, further comprising:
determining whether a set of the particular tone data counts result n a non-integer number of data bits per symbol;
determining that non-integer numbers of bits are unable to be processed in the OFDM system; and
limiting selection of code rates in response to determining that non-integer numbers of bits are unable to be processed and that bit padding is unavailable.

9. The method of claim 1, further comprising:
reusing the interleaver when expanding from a smaller channel bandwidth to a larger channel bandwidth by modifying the interleaver to accommodate a matrix defined to write and read data in the OFDM system with the greater channel bandwidth.

10. The method of claim 9, wherein:
parameters of the matrix comprise $N_{ROW}$ and $N_{COL}$, which define a number of coded symbols stored in the interleaver, and Nor, which defines a rotation of values when more than one spatial stream exists, a size of the interleaver is independent of $N_{ROT}$, and $N_{ROT}$ is ignored when selecting the total data tone count.

11. An apparatus of a communication device, the apparatus comprising:
processing circuitry configured to:
iterate, when predetermined conditions are met, through a plurality of total data tone counts to determine particular tone data counts that satisfy:

$$\frac{N_{CBPS}}{INT_{DIM}} - \left\lfloor \frac{N_{CBPS}}{INT_{DIM}} \right\rfloor = 0,$$

$$N_{DBPS} - \lfloor N_{DBPS} \rfloor = 0,$$

and
where $N_{CBPS}$ is a number of coded bits per symbol, $INT_{DIM}$ is a number of coded symbols stored in an interleaver, and $N_{DBPS}$ is a number of data bits per symbol;
select a total data tone count, from among the particular tone data counts; and
modulate a data payload in accordance with orthogonal frequency division multiplexing (OFDM) transmission in an OFDM system over an identified one of the channel bandwidths based on the total data tone count; and
a transceiver configured to communicate using the identified one of the channel bandwidths.

12. The apparatus of claim 11, further comprising:
an interleaver configured to interleave two or more codewords in the data payload before transmission on a channel of the identified channel bandwidth, wherein the number of coded symbols stored in the interleaver is proportional to an assigned interleaver parameter times a number of coded bits per single carrier.

13. The apparatus of claim 11, wherein:
the processing circuitry is further configured to determine whether iteration through the plurality of total data tone counts has been completed, and
the apparatus further comprises display circuitry configured to, after iteration through the plurality of total data tone counts has been completed, present one of:
the particular tone data counts, or
after the processing circuitry has determined that no particular tone data counts were determined, the plurality of total data tone counts and an indication that no particular tone data counts were determined.

14. The apparatus of claim 11, wherein the processing circuitry is further configured to:
in response to a determination that bit padding is available, select the total data tone from among the plurality of total data tone counts free from iterating through the plurality of total data tone counts to determine the particular tone data counts.

15. The apparatus of claim 11, wherein the processing circuitry is further configured to:
determine whether a set of the particular tone data counts result in a non-integer number of data bits per symbol;
determine that non-integer numbers of bits are unable to be processed in the OFDM system; and
limit selection of the total data tone count to avoid selection of the set of the particular tone data counts in response to determining that non-integer numbers of bits are unable to be processed and that bit padding is unavailable.

16. The apparatus of claim 11, wherein:
the number of coded bits per symbol is equal to a number of data subcarriers times a modulation order, and the number of data bits per symbol is a code rate times the number of coded bits per symbol, and the processing circuitry is further configured to:
   determine whether a set of the particular tone data counts result in a non-integer number of data bits per symbol;
   determine that non-integer numbers of bits are unable to be processed in the OFDM system; and
   limit selection of code rates in response to determining that non-integer numbers of bits are unable to be processed and that bit padding is unavailable.

17. A non-transitory computer-readable storage medium that stores instructions for execution by one or more processors of a communication device to configure the communication device for multiple bandwidth operation, the instructions to configure the communication device to:
   iterate, when predetermined conditions are met, through a plurality of total data tone counts to determine particular tone data counts that satisfy:

$$\frac{N_{CBPS}}{INT_{DIM}} - \left\lfloor \frac{N_{CBPS}}{INT_{DIM}} \right\rfloor = 0,$$

$$N_{DBPS} - \lfloor N_{DBPS} \rfloor = 0,$$

and
   where $N_{CBPS}$ is a number of coded bits per symbol; $INT_{DIM}$ is a number of coded symbols stored in an interleaver, and $N_{DBPS}$ is a number of data bits per symbol;
   select a total data tone count, from among the particular tone data counts;
   modulate a data payload in accordance with orthogonal frequency division multiplexing (OFDM) transmission in an OFDM system over an identified one of the channel bandwidths based on the total data tone count;
   interleave a plurality of codewords in the data payload before transmission on a channel of the identified channel bandwidth using an interleaver, the number of coded symbols stored in the interleaver proportional to an assigned interleaver parameter times a number of coded bits per single carrier, the interleaver being reused when expanding from a smaller channel bandwidth to a larger channel bandwidth by modification of the interleaver to accommodate a matrix defined to write and read data in the OFDM system with the greater channel bandwidth; and
   communicate using the identified one of the channel bandwidths.

18. The apparatus of claim 17, wherein the instructions further configure the communication device to:
   determine whether iteration through the plurality of total data tone counts has been completed, and
   after iteration through the plurality of total data tone counts has been completed, present one of:
      the particular tone data counts, or
      after the processing circuitry has determined that no particular tone data counts were determined, the plurality of total data tone counts and an indication that no particular tone data counts were determined.

19. The apparatus of claim 17, wherein the instructions further configure the communication device to:
   in response to a determination that bit padding is available, select the total data tone from among the plurality of total data tone counts free from iterating through the plurality of total data tone counts to determine the particular tone data counts.

20. The apparatus of claim 17, wherein the instructions further configure the communication device to:
   determine whether a set of the particular tone data counts result in a non-integer number of data bits per symbol; and
   one of:
      determine that non-integer numbers of bits are unable to be processed in the OFDM system; and limit selection of the total data tone count to avoid selection of the set of the particular tone data counts in response to determining that non-integer numbers of bits are unable to be processed and that bit padding is unavailable, or
      determine that non-integer numbers of bits are unable to be processed in the OFDM system, and limit selection of code rates in response to determining that non-integer numbers of bits are unable to be processed and that bit padding is unavailable.

* * * * *

UNITED STATES PATENT AND TRADEMARK OFFICE
CERTIFICATE OF CORRECTION

PATENT NO. : 9,882,753 B2  
APPLICATION NO. : 15/154340  
DATED : January 30, 2018  
INVENTOR(S) : Kenney et al.

Page 1 of 1

It is certified that error appears in the above-identified patent and that said Letters Patent is hereby corrected as shown below:

In the Claims

In Column 7, Line 46, in Claim 8, delete "n" and insert --in-- therefor

In Column 7, Line 64, in Claim 10, delete "Nor," and insert --$N_{ROT}$,-- therefor In Column 9, Line 28, in Claim 17, delete "symbol;" and insert --symbol,-- therefor Signed and Sealed this  
Fourth Day of June, 2019

Andrei Iancu  
*Director of the United States Patent and Trademark Office*